June 29, 1965 R. T. TOWNSEND 3,191,222
MACHINE FOR ENCASING SAUSAGE AND THE LIKE
Filed April 22, 1963 7 Sheets-Sheet 1

Inventor
Ray T. Townsend
by Bair, Freeman & Molinare
Attorneys

June 29, 1965 R. T. TOWNSEND 3,191,222
MACHINE FOR ENCASING SAUSAGE AND THE LIKE
Filed April 22, 1963 7 Sheets-Sheet 4

Fig. 9.

Inventor: Ray T. Townsend
by Bair, Freeman & Molinare
Attorneys

June 29, 1965　　　　R. T. TOWNSEND　　　　3,191,222
MACHINE FOR ENCASING SAUSAGE AND THE LIKE
Filed April 22, 1963　　　　　　　　　　　　7 Sheets-Sheet 5

Inventor
Ray T. Townsend
by Bair, Freeman & Molinare
Attorneys

_United States Patent Office_

3,191,222
Patented June 29, 1965

3,191,222
MACHINE FOR ENCASING SAUSAGE
AND THE LIKE
Ray T. Townsend, Des Moines, Iowa, assignor to Townsend Engineering Company, Des Moines, Iowa, a corporation of Iowa
Filed Apr. 22, 1963, Ser. No. 274,700
13 Claims. (Cl. 17—33)

The present application is a continuation-in-part of my copending application, Serial No. 194,523, filed May 14, 1962, now Patent No. 3,115,668 of December 31, 1963.

This invention relates to a machine for encasing a product such as sausage and the like, the machine being automatically operable through complete cycles of operation each of which encases a relatively long length of the product, links the product casing and loops the links and deposits them on a looping conveyor from which they are readily removable on smoke sticks or the like, the cycles of operation continuing as long as product casings are present in a hopper of the machine.

One object of the invention is to provide a relatively simple machine which, after encasing the product, divides the casing into links of accurately controlled diameter and length and therefore weight such as is impossible of attainment with linking machines to which encased sausage or the like is supplied from a manually controlled casing filling machine.

Another object is to provide linking mechanism comprising a rotating chuck through which the encased product is forced whereby the chuck rotates the product casing, means being provided to control the diameter of the casing and periodically separate it into links in such manner as to prevent rotation of the links after they are formed.

Still another object is to provide a simple link looper in the form of a rotating spiral tube, the links being fed into one end of the tube and discharged from the other, a linking conveyor being provided to receive the loops and space them in such manner that they may readily be transferred onto a smoke stick or the like preparatory to being racked up on frames for smoking and/or cooking the encased product.

A further object is to provide a metering pump for the material fed to the casing and to regulate the speed of the linking mechanism in relation thereto so as to adjust and accurately control the quantity of product and the length of each link and thereby the weight of each link.

Still a further object is to provide means for automatically operating the machine through complete cycles of operation as long as product casings are fed to a hopper of the machine, the machine automatically stopping upon depletion of the product casings in the hopper.

An additional object is to provide a machine in which there is a continuous unidirectional flow of product into the product casing and of filled casings through the machine without starting and stopping, the linking of the casing being done "on the fly."

Another additional object is to provide in general a machine for processing sausages or frankfurters and the like in a continuous manner once the machine starts whereupon the machine passes through a plurality of complete cycles corresponding to the number of casings fed to the machine, and while so doing the operator may proceed to transfer looped links from the looping conveyor to smoke sticks and place them on frames for smoking and/or cooking the product, thus effecting considerable production of filled, linked and looped sausages or frankfurters by one operator.

With these and other objects in view, my invention consists in the construction, arrangement and combination of the various parts of my machine for encasing sausage and the like, whereby the objects above contemplated are attained, as hereinafter more fully set forth, pointed out in my claims and illustrated in detail on the accompanying drawings, wherein:

On the accompanying drawings I have used the reference numeral 10 to indicate a housing supported by legs 12. The housing 10 is provided with a top 14.

Figure 9:
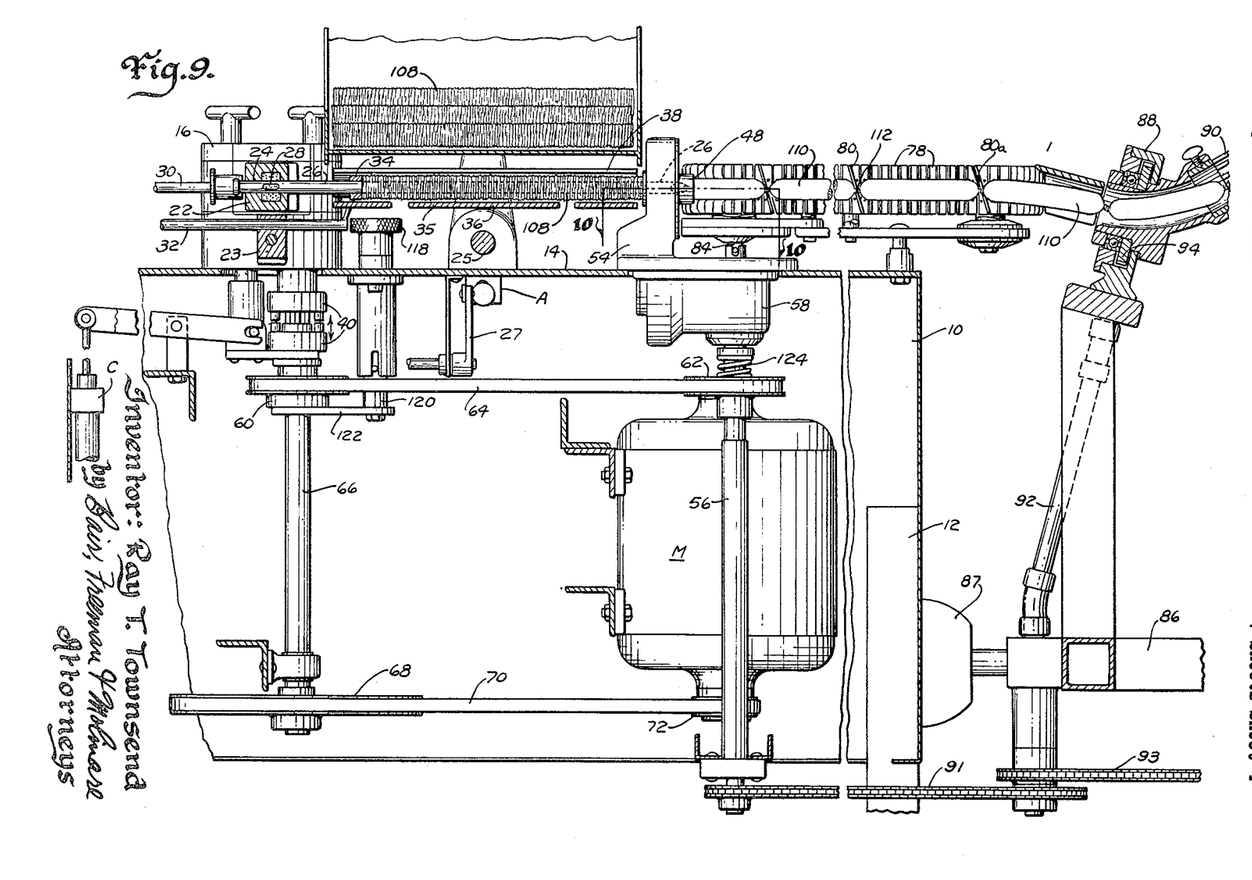
FIG. 9 is a detailed enlargement of the right-hand end of FIG. 4 showing also a motor and associated drive mechanisms for certain components of the machine, the near wall of the housing for the motor being removed.

Mounted on the top 14 is a meat mixture pump 16 to which a meat mixture conduit 18 extends. An outlet housing 22 is held in contact with the pump 16 by means of a set screw 21 which has a knob 19 thereon and is screw-threadedly mounted through a stationary bracket 23. This arrangement facilitates removal of the housing 22 for cleaning purposes. The housing has a bore 24 as shown in FIG. 9 slidably receiving a stuffer tube 26. The stuffer tube has ports 28 therein adjacent its left-hand end as shown in FIG. 1 and is connected with a piston rod 30 extending into an air cylinder D as shown in FIG. 13 and provided therein with a piston in the usual manner so that the piston can be reciprocated pneumatically relative to the cylinder D and in turn will reciprocate the stuffer tube 26.

Figures 13, 14, 15:
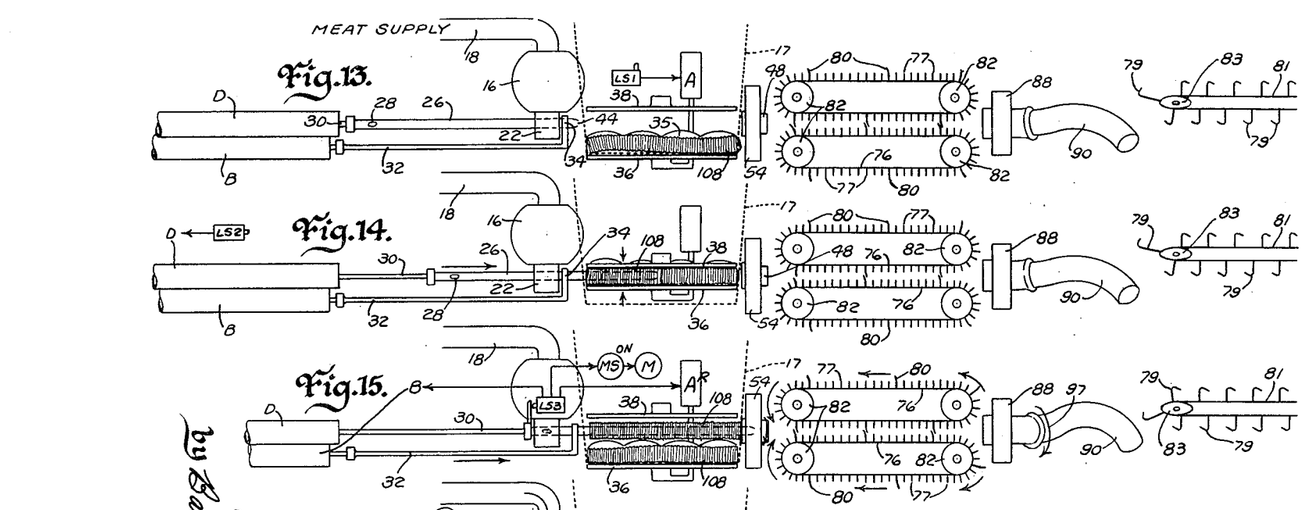
FIG. 13 is a diagrammatic plan view of the machine showing a product casing in position to initiate cycles of operation of the machine.
FIG. 14 is a similar diagrammatic view showing the casing clamps closing and a filler tube moving into the casing.
FIG. 15 is a similar diagrammatic view showing the casing clamps reopened so that another product casing can drop into position, a casing follower moving into position and a motor switch closed for energizing the motor of the machine.

A second air cylinder B is provided as shown in FIG. 13 from which a piston rod 32 extends slidably through the bracket 23 and on which a casing follower 34 is mounted. The follower is perforated to receive, and is slidable on, the stuffer tube 26.

Figure 2:
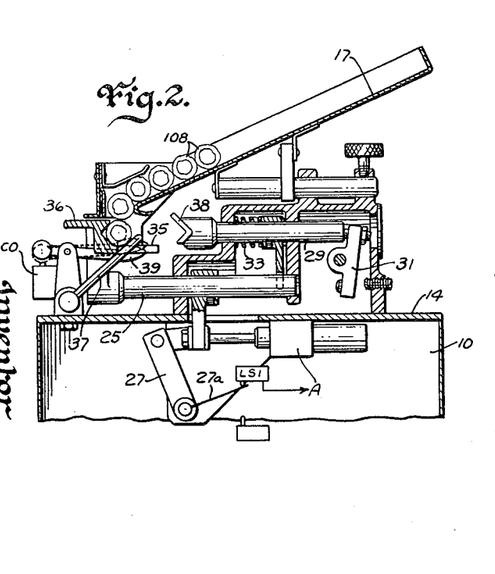
FIG. 2 is an enlarged vertical sectional view on the line 2—2 of FIG. 1.
Figure 3:
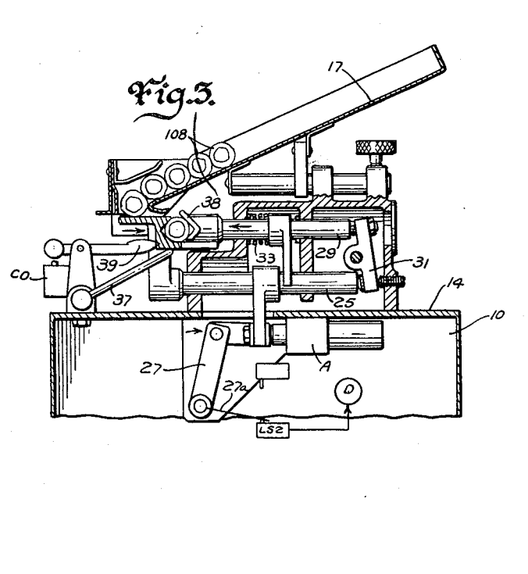
FIG. 3 is a similar sectional view showing certain parts in a different position.

Aligned with the stuffer tube 26 is a casing clamp for a product receiving casing 108. This clamp comprises a front V-seat 36 and a back V-seat 38, the front seat being mounted on a slide rod 25 as shown in FIGS. 2 and 3 and the back seat being mounted on a slide rod 29. The V-seats 36 and 38 are adapted to move alternately to the open position shown in FIG. 2 and the closed position shown in FIG. 3. To accomplish such movement the front V-seat 36 is reciprocated by an air cylinder A, and reciprocates the slide rod 29 and thereby the V-seat 38 in the opposite direction through a rock lever 31 in opposition to a spring 33. A lever 27 is operatively connected with the air cylinder A which has a limit switch actuating arm 27a.

Figure 1:
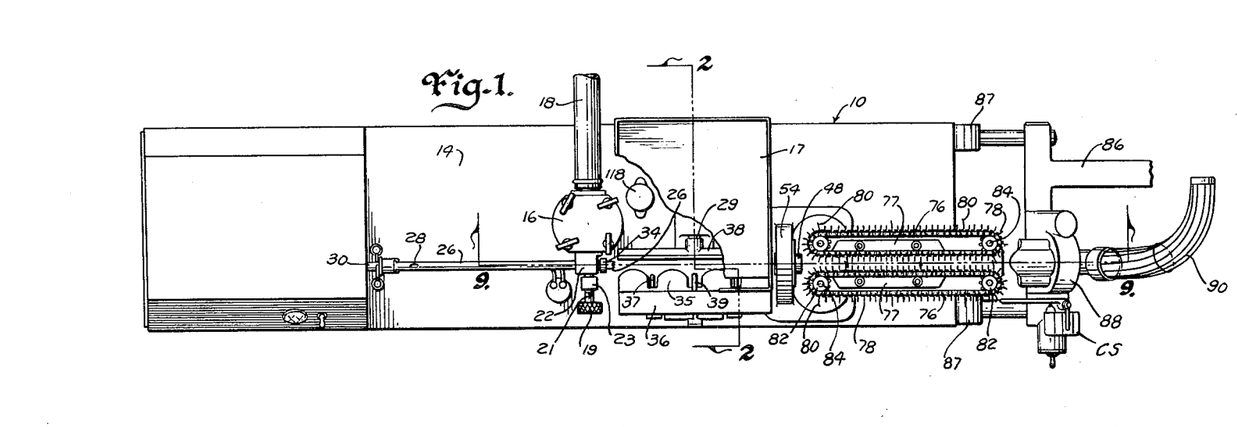
FIG. 1 is a plan view with parts broken away of a machine for encasing sausage and the like embodying my invention.

FIGS. 1, 2 and 3 also show a hopper 17 for product casings 108 which feeds them into position onto a sectional shelf 35 of the front V-seat 36 where they are retained by retainer fingers 37 lightly spring-biased upwardly. A weighted sensing hook 39 is pivotally mounted adjacent the V-seat 36 and is operable to actuate a cutout switch CO to open position when it assumes the dotted line position shown in FIG. 2 due to absence of casings 108. The arm 27a is adapted to actuate a limit switch LS1 as shown diagrammatically in FIG. 2 which in turn effects operation of the air cylinder A in a forward direction. As shown in FIG. 3 the V-seat 36 rides over the sensing hook 39 and depresses the retainer fingers 37 when the clamp 36–38 is in the closed position, and the arm 27a actuates a limit switch LS2 which effects operation of an air cylinder D.

Figure 11:
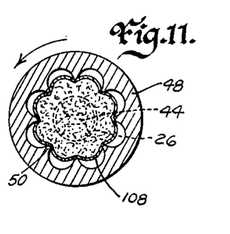
FIG. 11 is an enlarged vertical sectional view on the line 11—11 of FIG. 10 to show the coaction of the product casing chuck with a product casing.
Figure 11A:
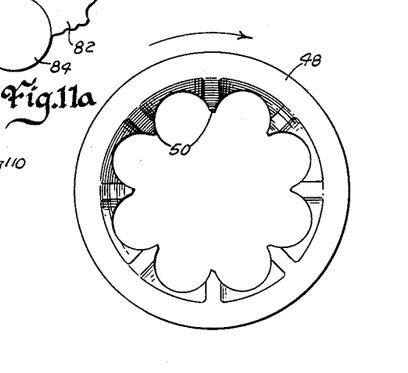
FIG. 11a is an enlarged end elevation of the casing chuck per se as viewed on the line 11a—11a of FIG. 10.

At the right-hand end of the casing clamp 36–38 I provide a casing chuck 48 in the form of a rotatable tube having inwardly extending flutes 50 as shown in FIG. 11. The casing chuck 48 is carried by a gear 52 which serves to rotate it, the gear being journaled in a housing 54 and operatively connected to a vertical shaft 56 by suitable gearing in a gear housing 58 as shown in FIG. 9. The shaft 56 is driven by variable diameter pulleys 60 and 62 and a belt 64 from a pump shaft 66. The speed of the shaft 56 may thus be adjusted in relation to the speed of the pump shaft 66. A rotatable speed adjusting knob 118 is shown for this purpose. The knob is screw-threadedly connected with a vertically movable shaft 120 having an arm 122 to regulate the distance between the two sides of the variable diameter pulley 60, the pulley 62 being reversely varied by the tension of the belt 64 as opposed by a spring 124. The pump shaft has a pulley 68 thereon driven by a belt 70 from a pulley 72 on the shaft of a motor M, and a clutch 40 is provided between the pump shaft 66 and the pump 16 and is adapted to be actuated by an air cylinder C as shown in FIG. 9.

Figure 10:
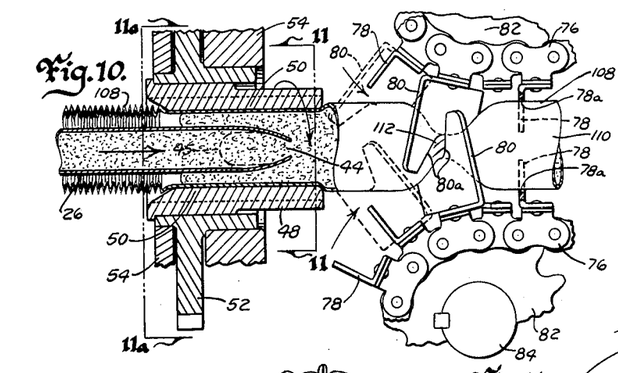
FIG. 10 is an enlarged horizontal sectional view on the line 10—10 of FIG. 9 showing a linking mechanism which cooperates with the product casing chuck in linking a filled product casing.

To the right of the gear housing 54 is a linking device comprising a pair of chains 76 provided with casing guide lugs 78 shown as one on each alternate link of the chain except at six points on each chain where crimping lugs 80 are provided as shown in FIGS. 1, 9 and 10 and 13. The guide lugs 78 are provided with notches 78a while the lugs 80 are provided with notches 80a, the relative depths of which are less in 78 than in 80 with respect to the sausage being linked as shown in FIG. 10. The chains 76 extend around four sprockets 82 and are back-supported by plates 77. The left-hand sprockets in FIGS. 1, 4 and 9 and the two sprockets shown in FIG. 10 are mounted on vertical shafts 84 extending from the gear housing 58 and driven by suitable gearing therein.

Figure 12:
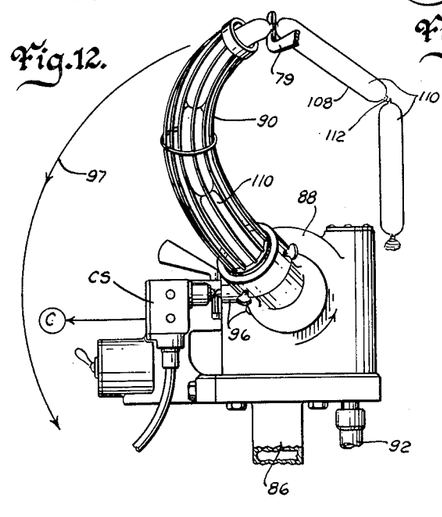
FIG. 12 is an enlarged end elevation of the rotating spiral tube for the discharge of sausage links as taken on the line 12—12 of FIG. 4 and shows one of the loop conveyor hooks coacting with the string of sausage links.
Figures 16, 17:
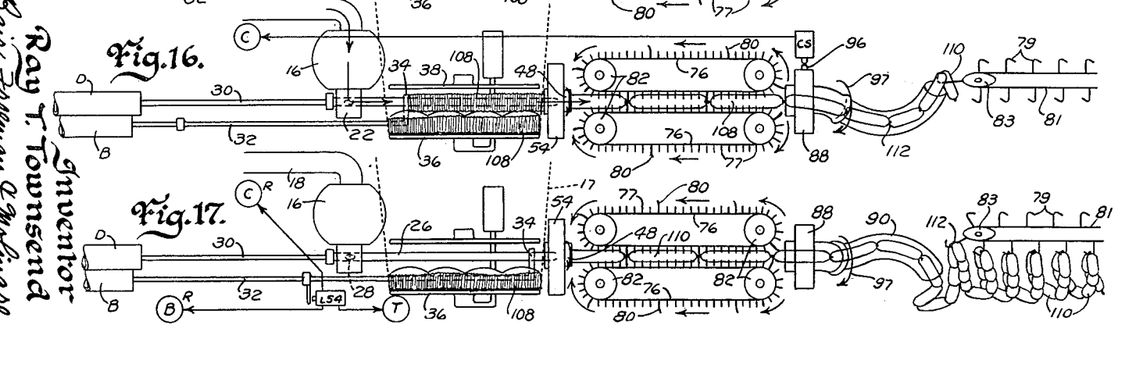
FIG. 16 is a similar diagrammatic view showing a rotating spiral looper tube assuming a position which engages a clutch of the machine.
FIG. 17 is a similar diagrammatic view showing retraction of the casing follower, disengagement of the clutch and operation of a timer.

At the right-hand end of the machine (FIGS. 1, 4 and 9) a link looper is shown and an end view thereof is shown in FIG. 12. The looper comprises a supporting frame 86 connected to the housing 10 by connecting means shown at 87 and supported at the outer end by a leg 89, such frame having a gear housing 88 thereon and a helical conveyor tube 90 of open work construction (such as being formed by rods as illustrated) is journaled in the housing 88 as shown in FIG. 9 and has thereon a worm gear 94 driven by a shaft 92. The shaft in turn is driven by a chain 91 from the vertical shaft 56. The gearing is designed so as to provide the correct relative speeds of the casing chuck 48, the linking chain 76 and the link looper 90. FIG. 12 shows a clutch switch CS adapted to be actuated by a projection 96 and illustrates diagrammatically that the clutch switch CS actuates a clutch air cylinder C. This is also shown in FIG. 16 and in FIG. 17 a limit switch LS4 is shown for actuating the cylinder C in the reverse direction (for disengaging the clutch as distinguished from engaging it in FIG. 12).

Figure 4:
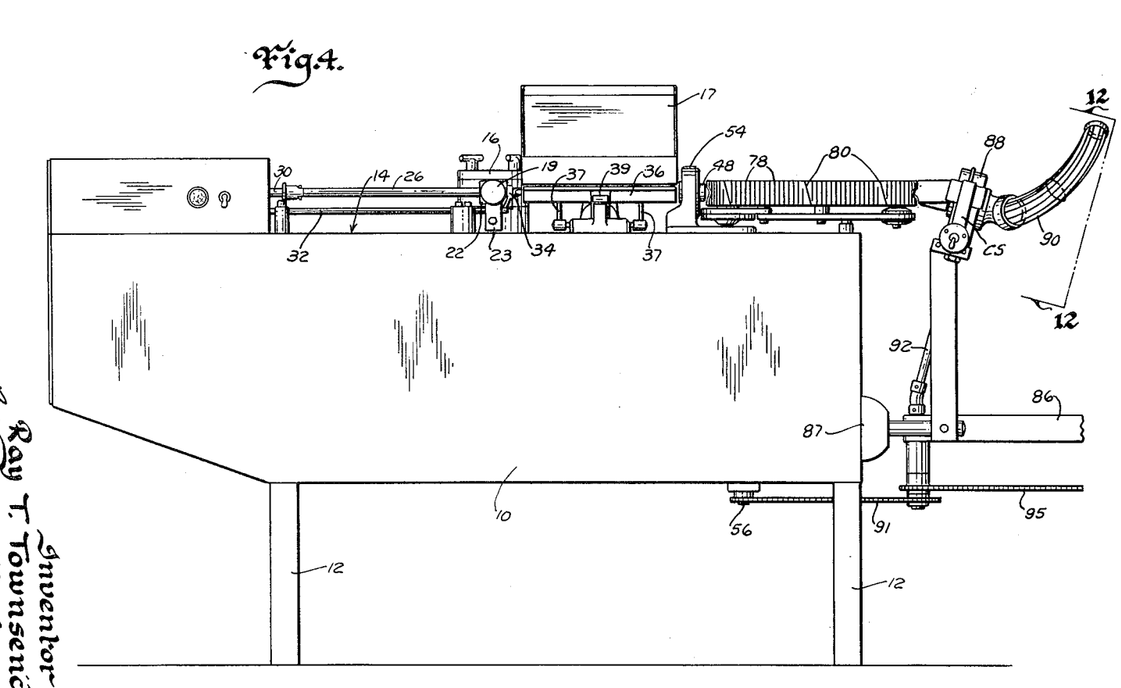
FIG. 4 is a front elevation of the machine shown in FIG. 1.
Figures 5, 6, 7, 8:
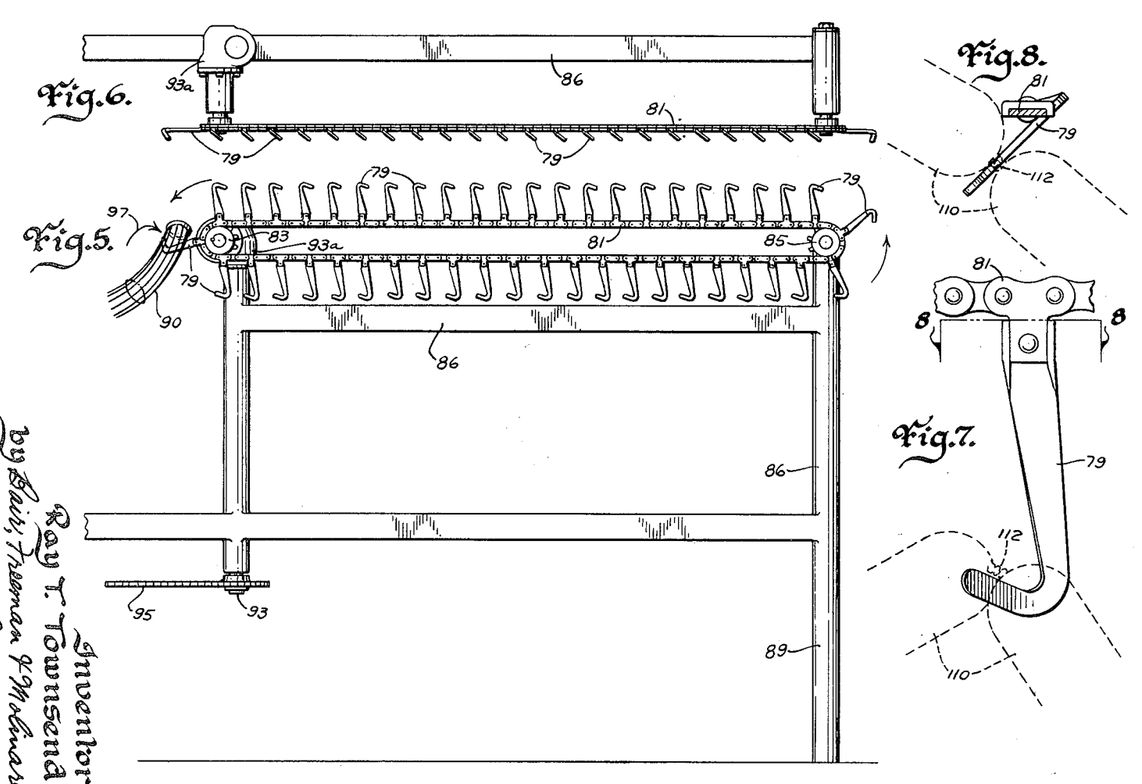
FIG. 5 is a front elevation of the looper conveyor, being a continuation of the right-hand end of FIG. 4.
FIG. 6 is a plan view of FIG. 5, being a continuation of the right-hand end of FIG. 1.
FIG. 7 is an enlarged side elevation of one of the loop conveyor hooks shown in FIG. 5 and illustrating how a pair of links are looped thereover.
FIG. 8 is a horizontal sectional view on the line 8—8 of FIG. 7 to further illustrate the manner of looping the links on the conveyor hook.

As shown in FIGS. 5 and 6 the supporting frame 86 and the leg 89 also support a loop conveyor chain 81 on sprockets 83 and 85. The sprocket 83 is driven through a gear box 93a from a vertical shaft 93 which in turn is driven by a chain 95 from the shaft 92 as shown in FIGS. 4 and 9. The sprocket 85 is an idler sprocket. The links of the chain 81 are periodically provided with loop-supporting hooks 79 of the twisted shape shown in FIGS. 5, 6, 7 and 8 and particularly in FIG. 8. The drive for the sprocket 83 is timed in relation to the link forming machine such that 8 or 10 links may loop between successive hooks (8 being shown in FIG. 19).

Having described briefly the structure of my encasing machine, I will now describe the operation and purpose of various components thereof. Briefly the purpose of the machine is to load the empty meat mixture receiving casing 108 with product such as sausage, frankfurter ingredients, cereal or the like in plastic condition or as an emulsion so that it can be pumped into the product casing, fill the casing with a high degree of accuracy, link the casing into links of substantially equal and accurate weight and loop the linked strand of casing on the loop conveyor.

Automatic cycling is desirable as long as there are casings 108 in the hopper 17. Usually these are of cellulose acetate in the form of a tube folded bellows-like so that the filling of the casing with product and the linking and looping thereof automatically proceed until the casing has been completely filled and the machine then recycles if there are further casings in the hopper. Whenever the hopper is empty and therefore no casing on the shelf 35 to depress the hook 39, it actuates the cutout switch CO which deenergizes all circuits of the machine thereby causing the machine to stop.

Heretofore product casings of the character mentioned have been filled manually by slipping the folded casing on a stuffer tube (similar to the tube 26) from which the meat mixture or emulsion was extruded under high pressure (approximately 100 p.s.i.). The operator controlled the filling by applying pressure with his hands to retard unfolding and movement of the folded casing off the end of the stuffer tube. Uniform filling was dependent on the skill of the operator and variations in diameter and thus weight per unit of links was the rule rather than the exception. These casings come folded as illustrated in FIGS. 9 and 10 with approximately 55 ft. of the casing condensed into a length of 12 or 13″. The 55 foot length of filled casing was projected onto a table after which a linking machine produced links of uniform length but if the diameter varied, the weight likewise varied. In controlling the casing as it leaves the stuffer tube an increase of hand pressure retards the movement of the casing and since the pumping rate of the meat is uniform the diameter increased and vice versa. Thus it was difficult to finally package a certain number of links and have all the packages weigh the same.

On the other hand, my machine is designed so as to obtain accuracy of pressure on the casing by means of the casing chuck 48 which holds it to a uniform diameter, by means of the casing follower 34 under substantially uniformly constant pressure in the air cylinder B, and by the speed of operation of the linking mechanism 76–78–80, all of which cooperate with the pump 16 metering the flow of product so that the casing is held to a uniform diameter and linked at uniform intervals whereby uniform weight per link results.

Referring to FIG. 1, the casing 108 is stuffed by extrusion of the meat mixture by operation of the pump 16, the extrusion pressure being approximately 100 p.s.i. In addition to merely pumping the meat mixture the pump serves as a metering means therefor. This pump may be of the gear type or any other suitable type that produces accurate metering.

The folded casing 108 is shown threaded over the stuffer tube 26 and part of it has already been linked as at 110 in FIG. 10, after passing through the rotating casing chuck 48. The notches 78a of the guide lugs 78 of the chains 76 provide a tubular passageway having a circumference slightly larger than the casing 108 and travel at the same speed as the links 110 since they are part of a chain system that also carries the crimping lugs 80. Periodically the notches 80a of the crimping lugs engage the casing 108 and squeeze down the diameter thereof at the point of engagement which prevents rotation of the filled casing to the right of the engaging crimping lugs. Accordingly the continued rotation of the casing chuck 48 twists a restriction 112 in the casing thus producing the separate links 110 as shown in FIG. 9. The crimping lugs 80 are shown dotted in FIG. 10 at a position just prior to the full line position where they start to engage and crimp the casing 108 to form of it the links 110.

Figure 19:
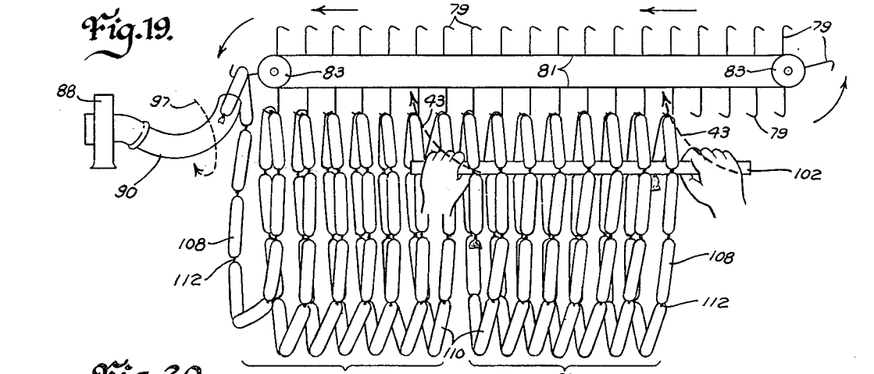
FIG. 19 is a diagrammatic side view of the looping conveyor showing sausage links hanging thereon and a smoke stick threaded through one strand of links to be lifted off the hooks of the conveyor while a second strand is being positioned on the conveyor by the rotating looper tube.

The links 110 pass through the helical conveyor tube 90 of the looper which is rotating in the direction of the arrow 97 as shown in FIG. 12. The tube 90 thereby swings the strand of links into circles which are intercepted by the hooks 79 as illustrated. The parts are timed so that a hook 79 is in the proper position for engagement between two links and with a predetermined number of links between successive hooks. The timing of the parts involves rotation of the outer end of the tube 90 at approximately the same speed that the links issue from it so that the loops of links as they are formed are substantially stationary for ready coaction with the hooks 79. As shown in FIG. 19 eight loops of links accumulate on the hooks 79 and a first group indicated 41 is ready to be removed on a smoke stick 102 by thrusting the smoke stick to the position shown and then lifting it as indicated by the arrows 43. A second group 47 of looped links is just about being completed and will be in the position 41 approximately by the time the operator has placed the first group in the smoke house.

Describing the operation more in detail, the casing clamp 36–38 is open as shown diagrammatically in FIG. 13 so that a folded casing 108 may drop from the hopper 17 onto the shelf 35 adjacent the V-seat 36. Such casing depresses the weighted hook 39 to close the cutout switch CO and thereby energize the machine circuits so that limit switch LS1 (closed in FIG. 2) effects operation of the air cylinder A in the forward direction from the position shown in FIG. 2 to the position shown in FIG. 3. The V-seat 36 brings the lowermost casing 108 of FIG. 2 to the position indicated 108a in FIG. 3 and the V-seat 38 also cooperates with this casing to straighten it (some times they are somewhat crooked) and line it up for receiving the filler tube 26 as shown in FIG. 14. As shown diagrammatically in FIG. 3 the arm 27a actuates the limit switch LS2 which is operable to actuate the air cylinder D in a forward direction. This is also illustrated diagrammatically in FIG. 14. Accordingly the filler tube 26 advances into the casing 108, being shown about half way therein.

When the filler tube is entirely in the casing as shown in FIG. 15, a limit switch LS3 is operated for effecting actuation of the air cylinder B in the forward direction thus moving the piston rod 32 and thereby the casing follower 34 toward the right in FIG. 15 to engage the casing 108 and tend to force it through the casing chuck 48. At this time the ports 28 are within the outlet housing 22 so that upon operation of the pump 16 the meat mixture can be pumped into the casing 108. It will be noted that the discharge end of the filler tube 26 is inside the chuck 48 which is the position illustrated in FIG. 10. The limit switch LS3 also effects closure of a motor switch MS (indicated "MS$^{ON}$" in FIG. 15) to energize the motor M which drives the chuck 48, the linking chains 76, the looper 90 and the loop conveyor 81. The limit switch LS3 also effects actuation of the air cylinder A in the reverse direction (indicated "A$^R$") for opening the clamp 36–38 to thereby permit free rotation of the casing 108 with the casing chuck 48.

When the looper 90 comes to the position shown in FIGS. 12 and 16, the clutch switch CS is actuated by the projection 96 for actuating the air cylinder C to effect engagement of the clutch 40 as indicated diagrammatically in these two figures. Engagement of the clutch causes the meat pump 16 to operate and stuffing of the casing 108 begins. The projection 96 is located so as to cause the first or second sausage or link 110 to catch on a hook 79 of the loop conveyor 81, the particular hook at that time being the one shown at the far left in FIG. 5 and also illustrated in FIG. 12.

When the casing 108 is almost completely filled as shown in FIG. 17, the casing follower 34 comes to a position adjacent the chuck 48. A limit switch LS4 is thereupon actuated to effect actuation of the air cylinder B in the reverse direction (indicated "B$^R$") for retracting the casing follower. The limit switch LS4 also effects disengagement of the clutch 40 (indicated diagrammatically "C$^R$" for clutch release). The limit switch LS4 also energizes a timer T.

Figure 18:
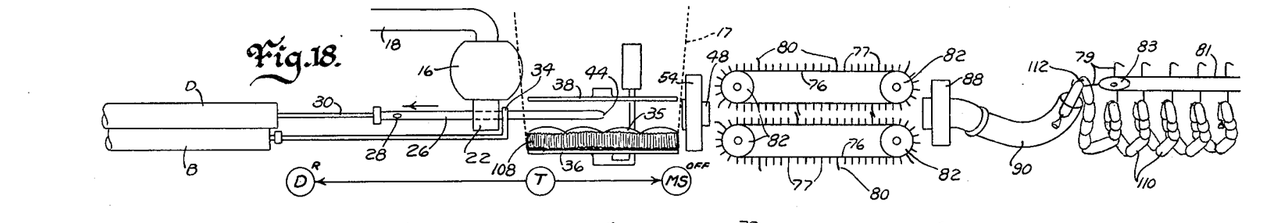
FIG. 18 is a similar diagrammatic view showing the timer stopping the motor by opening the motor switch and effecting retraction of a filler tube.

Referring to FIG. 18, the timer T permits the motor M to operate a few seconds longer after the operation depicted in FIG. 17 so as to carry the remaining end of the filled casing through the looper 90 and to the conveyor hooks 79 as illustrated in this figure. Thereupon the timer causes the motor switch to open the circuit of the motor M as indicated diagrammatically "MS$^{OFF}$". The timer T also effects actuation of the air cylinder D in the reverse direction (D$^R$) so as to retract the filler tube 26 which is shown being retracted in this figure. The machine will now stop operating unless there is another casing 108 in position such as shown in FIG. 18 whereupon the machine recycles because of the cutout switch CO being closed by reason of the presence of additional casings in the hopper.

From the foregoing description it will be obvious that the stuffer tube 26 and its ports 28 act as a meat mixture valve by movement of the ports out of the outlet housing 22 soon after the stuffer tube starts retracting as in FIG. 18 and seals off the meat mixture from contact with air. At the same time parts of the stuffing apparatus are kept fully charged with the product and dribbling is eliminated by disengagement of the clutch 40 interposed between the shaft 66 (which drives all other operative elements of the machine) and the meat pump 16.

In the linking operation the flutes 50 of the casing chuck 48 depress portions of the casing 108 as shown in FIG. 10 and are tapered at their left-hand end to readily receive the filled casing and accomplish such depression to the extent necessary for rotating the entire folded casing about the stuffer tube 26 and produce the desired linking action. The casing is forced through the casing chuck by the pressure of the meat mixture as it issues from the stuffer tube 26.

After leaving the casing chuck, the casing is guided and supported by the lugs 78 of the chain 76 which keeps the filled casing from collapsing or deviating from a straight path. The crimping lugs 80 are arranged in mating pairs and spaced the length of the link desired. These lugs progressively pinch down on the filled casing as it is moved along by being filled from the pump 16 (the speed of the chain 76 being synchronized with that of the casing as it comes from the stuffer tube) thus reducing the casing diameter at the link ends. When the casing is pinched down to a small dimension as indicated at 112 it loses strength so it is no longer able to rotate the portion of the casing on the downstream side of the crimping lugs. The preceding link 110 thereupon stops rotating and is a finished link.

The rotary speed of the casing chuck is determined by the number of twists 112 desired between successive links. Usually two twists is sufficient. Therefore the casing chuck is geared to make two revolutions while the linking chains advance the distance between crimping lugs or the length of one link. The product leaving the chain is a filled, linked, non-revolving strand. Since the strand is not revolving it can be readily controlled and automatically linked and looped by the relatively simple linking and looping means disclosed. Since the meat mixture pump 16 operates at a uniform fixed speed, it is obvious that the output volume of the meat mixture is uniform. Also since the linking chains are positively driven at a predetermined relative speed from the pump, it is also obvious that each link will have the same quantity of meat mixture and the links will be of equal weight. By use of the variable speed drive 60–62–64 the operator is able to adjust the amount of meat mixture in each link. For example, should more meat mixture be required he slows down the linking chains relative to the pump. Since the length of each link is fixed by the spacing of the crimping lugs 80, this will increase the diameter of each link and accordingly its weight. The casing chuck 48 is an important feature of my machine. The several tapered flutes 50 may be varied in number and shape to accommodate different conditions. The folded casing is lightly forced against the taper of the flutes by the casing follower 34 which accomplishes engagement of the casing with the flutes thus furnishing the rotating force to turn the folded or bellows-like casing 108 on the stationary stuffing tube 26 and propel the folded casing axially yet allow the folds to unfold as the casing is filled. The casing 108 (which is pliable and somewhat elastic when damp from the product encased in it) bulges between the flutes 50 just after leaving the tube 26 and before entering the lugs 78 and 80 of the linking chains 76 (FIG. 10) and this bulging produces uniform resistance to movement of the filled casing through the chuck 48. As the casing is filled, it assumes the cross sectional shape shown in FIG. 11 and is somewhat keyed or splined into the casing chuck. This shape of flute allows smooth flow of product through the chuck and eliminates casing shapes that allow collapse that result in links of random length. The bulging shape given to the filled casing tends to frictionally hold the casing within the chuck as necessary to keep it from being moved through the chuck too easily. The constriction afforded by the flutes furnishes a light drag to the filled casing. This action also tends to avoid stopping the casing in its continuous movement through the machine. The number of flutes in the chuck may be varied to vary this drag.

The design of my encasing machine is such that it is capable of high speed operation without fracture of the casing 108. Referring to FIG. 10 it will be noted that the casing guide lugs 78, as they swing around the sprockets 82, pass relatively close to the casing chuck 48. The V-notches 80a of the crimping lugs 80 pass even closer so that when they initially engage the filled casing, the point of engagement is quite close to the point of filling which is somewhat of an open end 44 as shown and extending back to the extent shown dotted at 45. This relieves the additional pressure caused by crimping the casing so that the casing does not burst even though being filled, crimped and linked at high speed. Furthermore, the crimping lugs 80 in swinging around the sprockets 82 attain a greater speed than the portions of the chains 76 travelling in straight lines and therefore tend to impart additional pull to the casing in the area between the downstream end of the casing chuck 48 and the point at which the crimping lugs engage the filled casing, thus further reducing the pressure for minimizing the possibility of casing breakage or fracture. Rather than being laterally at right angles across the chain 76, the crimping lugs 80 are at an angle as shown in FIG. 10 and the angles of the interlocking lugs so cross each other that the restriction 112 to form the link 110 results from the crimping lugs pinching into the casing at the same angle as the natural folds of the casing as it starts to twist due to rotation in the direction of the arrow 49 on the chuck 48 in this figure. This also contributes to minimization of the possibility of casing breakage and all of the features mentioned in this paragraph make it possible to operate my machine at relatively high speeds.

Figure 20:
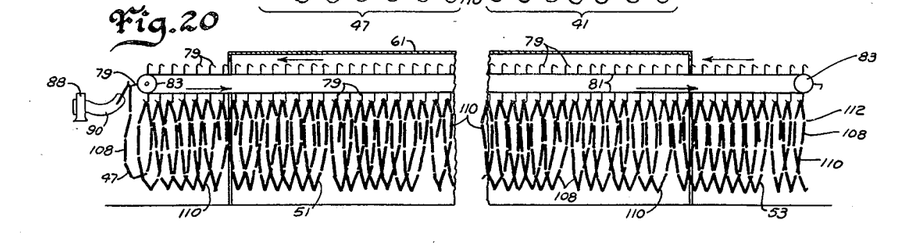
FIG. 20 is a diagrammatic view similar to FIG. 19 showing a modification.

FIG. 20 illustrates a further possibility with respect to the loop conveyor 79–81–83. The chain 81 is illustrated as extended indefinitely so as to pass completely through a smoke house 61 whereby the loops of sausage links may be allowed to remain on the conveyor while being smoked. An entering group of loops is illustrated at 47, a group being smoked at 51 and a group 53 beyond the smoke house at which point they may be removed for packaging or the like.

From the foregoing description it will be obvious that I have provided a machine which is substantially continuous in operation requiring only the supply of empty casings to a hopper thereof. It accordingly operates with a high rate of production due also to the automatic linking of the filled casing as it progresses through the linking chains in a continuous manner. The construction and operation is such that the portions of the casing between links are always twisted in the same direction thus avoiding the possibility of unwinding.

Obviously the operation of the casing chuck, linking chains and link looper may be constant, and the pump speed varied to adjust the accuracy of weight per link which is the reverse of the arrangement disclosed. The important consideration is relative speed and the speed adjusting knob 118 may be thus used to accurately control the weight in each link so that a specified number of links may equal one pound or other desirable unit of weight.

Some changes may be made in the construction and arrangement of the parts of my machine for encasing sausage and the like without departing from the real spirit and purpose of my invention, therefore it is my intention to cover by my claims any modified forms of structure or use of mechanical equivalents which may be reasonably included within their scope, and wherein the material being encased has been broadly referred to as "product."

I claim as my invention:

1. In a product encasing machine of the character disclosed, a stuffer tube adapted to have a folded casing positioned thereon, means for pumping plastic product into said stuffer tube and from said stuffer tube into the casing, a chuck mounted to receive the filled casing from the discharge end of said stuffer tube and having means to frictionally engage a portion of the casing, linking means for the filled casing issuing from said casing chuck, said chuck and said linking means cooperating during operation thereof to form said casing into links, a looper for the links as they issue from said linking means comprising a spiral-shaped tube having one end rotatably mounted on a horizontal axis and its other end extending radially from the axis of rotation, said rotatably mounted end receiving the links from said linking means and the other end thereof expelling them at substantially the same speed as the speed of rotation of said other end and in loop-forming circles, and a conveyor having a loop pick-up end adjacent said other end of said spiral-shaped tube and having spaced hooks to periodically engage the loops between links thereof whereby the links are looped on the hooks of the conveyor for ready removal therefrom and are continuously conveyed thereby away from said spiral-shaped tube.

2. A product encasing machine according to claim 1 wherein said conveyor comprises a pair of horizontally spaced sprockets and a chain extending around them and supporting said hooks, said spiral-shaped tube delivering loops to said hooks as they are spread apart when passing around one of said sprockets.

3. A product encasing machine comprising means for stuffing and linking a casing, and means for looping the stuffed and linked casing comprising a spiral-shaped tube having one end rotatably mounted on a horizontal axis and its other end extending radially from the axis of rotation, said rotatably mounted end receiving the links from said linking means and the other end thereof expelling them in loop-forming circles and at a rate corresponding substantially to the rate of rotation of said other end, and a conveyor having spaced hooks to periodically engage the loops between links thereof whereby the links are looped on the hooks of the conveyor for ready removal therefrom, said conveyor being driven in timed relation to the rotations of said spiral-shaped tube so that successive hooks thereof are positioned to receive successive loops from said spiral-shaped tube each revolution thereof.

4. A product encasing machine according to claim 3 wherein said conveyor comprises a pair of horizontally spaced sprockets and a chain extending around them and supporting said hooks, said spiral-shaped tube delivering loops to said hooks as they are spread apart when passing around one of said sprockets.

5. In a product encasing machine of the character disclosed, a stuffer tube adapted to be positioned in a folded casing, a hopper for casings, clamp means for the casings as they are received from said hopper, means responsive to the presence of a casing in said clamp means for closing it to position the casing for reception of said stuffer tube therein and for moving said stuffer tube into the positioned casing, means responsive to movement of said stuffer tube completely into the casing for opening said clamp means, means for forcing plastic product into said stuffer tube and from said stuffer tube into the casing, a casing follower movable along said stuffer tube, a casing chuck rotatably mounted to receive the filled casing from the discharge end of said stuffer tube and having means to frictionally engage the casing and rotate the same, linking means beyond the discharge end of said casing chuck having crimping means engageable with the casing to restrict its diameter at spaced positions therealong whereupon the rotation of said casing chuck twists the casing at such positions, thus providing successive links in the filled casing, and means responsive to the position of said casing follower when adjacent said chuck for retracting it and said stuffer tube to permit said clamp means to receive another casing from said hopper.

6. In a product encasing machine, a stuffer tube adapted to be positioned in a folded casing, a hopper for casings, means responsive to casings in said hopper to initiate operation of the machine, clamp means for the casings as they are received from said hopper, means responsive to such initiation for closing said clamp means to position the casing for reception of said stuffer tube therein, means responsive to said clamp means when closed for moving said stuffer tube into the positioned casing, means for forcing plastic product into said stuffer tube and from said stuffer tube into the casing, a casing follower movable along said stuffer tube, means responsive to said stuffer tube when completely in the casing for opening said clamp means, operating said means for forcing plastic product and moving said casing follower along said stuffer tube, a casing chuck rotatably mounted to receive the filled casing from the discharge end of said stuffer tube and having means to frictionally engage the casing and rotate the same, said casing follower being biased to force the casing toward said casing chuck, linking means beyond the discharge end of said casing chuck having crimping means engageable with the casing to restrict its diameter at spaced positions therealong whereupon the rotation of said casing chuck twists the casing at such positions, thus providing successive links in the filled casing, and means responsive to completion of the movement of said casing follower for retracting it and said stuffer tube to permit said clamp means to receive another casing from said hopper and for stopping said means for forcing plastic product.

7. In a product encasing machine, a hopper for casings, a clamp for receiving casings one at a time from said hopper, a product pump, a stuffer tube mounted for longitudinal movement into a casing held by said clamp, a casing follower movable along said stuffer tube, a casing chuck adapted to receive stuffed casings from said stuffer tube, linking means for the stuffed casing as it issues from said casing chuck, a looper for the linked casing as it issues from said linking means, power means for said product pump, said casing chuck, said linking means and said looper, a clutch connection between said power means and said product pump, and control means for the foregoing elements of said machine comprising means for sensing the presence of a casing received in said clamp from said hopper and operable to energize the machine, said clamp in the open position thereof thereupon effecting closure of the clamp, means responsive to closure of the clamp for moving said stuffer tube into the casing held by said clamp, means responsive to completion of the movement of said stuffer tube into the casing for energizing said power means whereby said casing chuck, linking means and looper are operated, opening said clamp and moving said casing follower into contact with the casing on said stuffer tube, means responsive to a predetermined position of said looper for engaging said clutch for operating said product pump, and means responsive to movement of said casing follower to a position adjacent said casing chuck for disengaging said clutch, retracting said casing follower, deenergizing said power means and retracting said stuffer tube for subsequent reception of the next casing in said clamp from said hopper.

8. A product encasing machine as claimed in claim 7 having means for varying the speed of said product pump in relation to the speed of operation of said casing chuck, said linking means and said looper.

9. In a product encasing machine, a hopper for casings, a clamp for receiving casings one at a time from said hopper, a product pump having a discharge port, a stuffer tube longitudinally slidable relative thereto and having a reception port, a casing follower movable along said stuffer tube, a casing chuck adapted to receive stuffed casings from said stuffer tube, linking means for the stuffed casing as it issues from said casing chuck, a looper for the linked casing as it issues from said linking means, power means for said product pump, said casing chuck, said linking means and said looper, a clutch connection between said power means and said product pump, and control means for the foregoing elements of said machine comprising means for sensing the presence of a casing in said clamp and operable to energize the machine, means responsive to the open position of said clamp to effect closure thereof, means responsive to closure of said clamp for moving said stuffer tube into the casing held by said clamp and thereupon aligning said reception port with said discharge port, means responsive to completion of the movement of said stuffer tube into the casing for energizing said power means whereby said casing chuck, linking means and looper are operated, opening said clamp and moving said casing follower into contact with the casing on said stuffer tube, means responsive to a predetermined position of said looper for engaging said clutch for operating said product pump, means responsive to movement of said casing follower to a position adjacent said casing chuck for disengaging said clutch, retracting said casing follower, deenergizing said power means and retracting said stuffer tube to a position permitting reception of the next casing in said clamp from said hopper.

10. In a product encasing machine, a hopper for casings, a clamp for receiving casings one at a time from said hopper, a product pump, a stuffer tube mounted for longitudinal movement into a casing held by said clamp, a casing follower movable along said stuffer tube, a casing chuck adapted to receive stuffed casings from said stuffer tube, linking means for the stuffed casing as it issues from said casing chuck, a looper for the linked casing as it issues from said linking means, power means for said product pump, said casing chuck, said linking means and said looper, a clutch connection between said power means and said product pump, and control means for the foregoing elements of said machine comprising means for sensing the presence of a casing received in said clamp from said hopper and operable to energize the machine, said clamp in the open position thereof thereupon effecting closure of the clamp, means responsive to closure of the clamp for moving said stuffer tube into the casing held by said clamp, means responsive to completion of the movement of said stuffer tube into the casing for energizing said power means whereby said casing chuck, linking means and looper are operated, opening said clamp and moving said casing follower into contact with the casing on said stuffer tube, means responsive to a predetermined position of said looper for engaging said clutch for operating said product pump, a timer, means responsive to movement of said casing follower to a position adjacent said casing chuck for disengaging said clutch, retracting said casing follower and operating said timer, and means responsive to timing out of said timer for deenergizing said power means and retracting said stuffer tube for reception of another casing in said clamp.

11. A product encasing machine according to claim 10 wherein said looper comprises a spiral tube having a receiving end and a discharge end, means for rotatably mounting said receiving end substantially axially thereof and on a substantially horizontal axis, said discharge end extending radially from such axis and thereby adapted to discharge the linked casing in circular loops, a conveyor having a series of spaced hooks, one to intercept each circle of loops as they are discharged from said spiral tube, said conveyor having a portion where said hooks are aligned to permit insertion of a smoke stick through all of the loops of one casing for removal thereof from said conveyor.

12. In a product encasing machine of the character disclosed, a stuffer tube adapted to be positioned in a folded casing, a pump for product to said stuffer tube, a hopper for folded casings, clamp means for a casing, means responsive to a casing in said clamp means for closing the clamp means to position the casing for reception of said stuffer tube therein, means responsive to closing of said clamp means for moving said stuffer a tube into the positioned casing, means thereupon operable to open said clamp means and operate said pump, a casing follower movable along said stuffer tube, means responsive to opening of said clamp means for effecting operation of said casing follower, a casing chuck rotatably mounted to receive the filled casing from the discharge end of said stuffer tube and having means to frictionally engage the casing and rotate the same, linking means beyond the discharge end of said casing chuck to provide successive links in the filled casing, looping means for the linked casing from said linking means, means responsive to positioning of said stuffer tube in the casing for operating said pump, casing chuck, linking means and looping means, said casing follower being operable upon close approach to said casing chuck to effect retraction of said casing follower, stoppage of said pump, chuck, linking means and looping means, and effect retraction of said stuffer tube to permit said clamp means to receive another casing from said hopper.

13. A product encasing machine according to claim 10 wherein said looper comprises a spiral tube having a receiving end and a discharge end, means for rotatably mounting said receiving end substantially axially thereof and on a substantially horizontal axis, said discharge end extending radially from such axis and thereby adapted to discharge the linked casing in circular loops, a conveyor having a series of spaced hooks, one to intercept each circle of loops as they are discharged from said spiral tube, and a smoke house or the like into which said conveyor extends.

References Cited by the Examiner
UNITED STATES PATENTS

| 2,776,449 | 1/57 | Cross | 17—34 |
| 2,807,830 | 10/57 | Millenaar | 17—34 |
| 3,115,668 | 12/63 | Townsend | 17—33 |

SAMUEL KOREN, *Primary Examiner.*

LUCIE H. LAUDENSLAGER, *Examiner.*